July 9, 1940.  C. L. TRIER ET AL  2,207,038
OVERLOAD CLUTCH
Filed April 22, 1939  2 Sheets-Sheet 1

INVENTORS:
Carl L. Trier and
James H. Livingston, III.
BY
ATTORNEY.

July 9, 1940.　　C. L. TRIER ET AL　　2,207,038

OVERLOAD CLUTCH

Filed April 22, 1939　　2 Sheets-Sheet 2

INVENTORS:
Carl L. Trier and
James H. Livingston, III.
BY
Norman E. H. Weletzke
ATTORNEY.

Patented July 9, 1940

2,207,038

UNITED STATES PATENT OFFICE 2,207,038

OVERLOAD CLUTCH

Carl L. Trier and James H. Livingston, 3rd, Baltimore, Md., assignors to Cherry-Burrell Corporation, Wilmington, Del., a corporation Application April 22, 1939, Serial No. 269,315

10 Claims. (Cl. 192—56)

This invention relates to improvements in overload clutches adaptable for the transmission of power by means of a simple, compact, positive acting clutch for use on machinery subject to occasional accidental stalling, such, for instance, as bottle washing machines.

The prime object of this invention is to provide a compact, automatic clutch which is simple in design, positive and reliable in operation, non-resilient in power transmission, economical to construct, which will transmit power up to a limited load only, depending upon the particular adjustment, and will become disengaged when that load is exceeded, which is adjustable for different load conditions, and which may be re-engaged after the predetermined load has been exceeded.

With the above and other objects and important features in view, the invention consists of novel features of construction and combination and arrangement of elements which will be readily apparent upon examination of the detailed disclosure of the figures and following description and claims, reference being made to the accompanying drawings in which:

Figure 1:
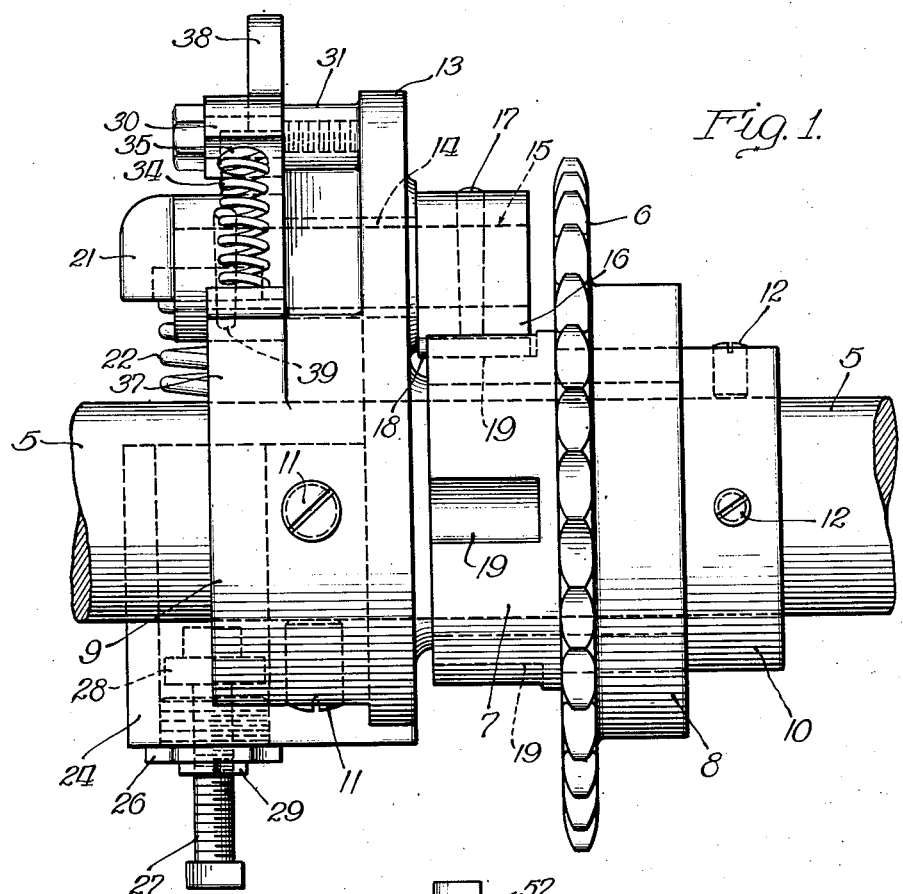
Figure 1 is a side elevation of the preferred embodiment of this invention in an overload clutch.
Figure 2:
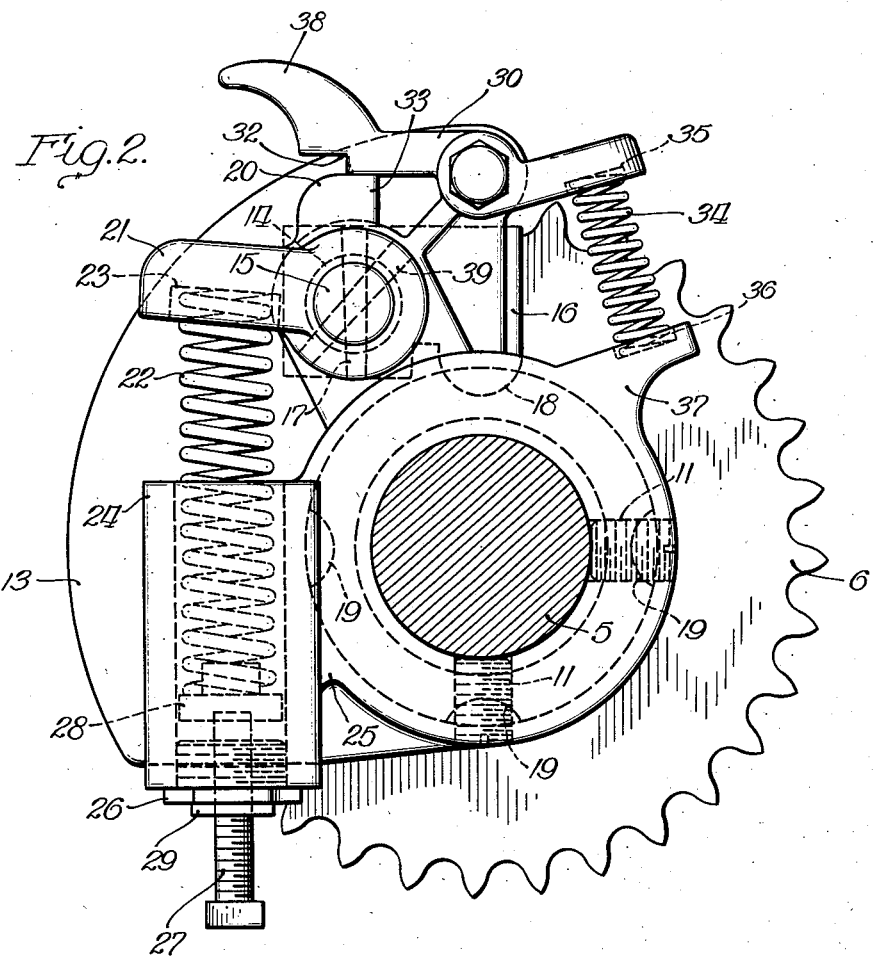
Figure 2 is an end view of the clutch shown in Figure 1.

Referring to the preferred embodiment of the invention which, in its preferred form, is illustrated in Figures 1 and 2, 5 designates a shaft or arbor suitably journalled in a frame (not shown). A driving gear or sprocket 6 is provided with laterally extending hubs 7 and 8 which are suitably journalled and free to rotate upon the shaft 5 intermediate abutting collars 9 and 10 keyed to the shaft by set screws 11 and 12, respectively, to prevent axial movement of the free-running gear 6.

An outwardly extending web or flange member 13 is formed integrally with the collar 9 on the outer periphery thereof and adjacent to the end of the collar 9 abutting up against the hub 7. The web member 13 is provided with a bored aperture 14 constituting a bearing for the pivot pin 15 which extends through said aperture 14 and is provided at its end adjacent hub 7 with a clutch element in the form of a latch cam or clutch element 16 keyed to the pin 15 by key 17 and having a semi-circular cam surface 18. The semi-circular cam surface 18 is adapted to engage and seat in one of a plurality of complementary semi-circular mortice grooves, engagements or seats 19 provided at spaced points in the outer periphery of hub 7. Through the intermediacy of hub 7, grooves 19, latch cam or clutch element 16, pivot pin 15 and web member 13, a driving motion is imparted from the driving gear 6 to the driven collar 9 and then in turn to the driven shaft 7 to which collar 9 is keyed.

The latch cam or clutch element 16 is normally maintained in engagement with the recesses in the driving hub 7 by a latch lever 20 keyed to the free end of pivot pin 15 by key 39 and is provided with a dog 21 subject to an adjustable degree of pressure from a compression spring 22 which tends to maintain the end of the latch cam 16 engaged in one of the recesses or seats 19.

The compression spring 22 is seated at its latch lever dog engaging end in a recess 23 provided therefor in the under surface of the dog 21 and is supported at its opposite end in a confining tube 24 which extends over and encloses a substantial portion of the spring 22. Tube 24 is fixed to and formed integrally with a web member 25 extending outwardly from the outer periphery of the collar 9. The tubular enclosure 24 is provided at one end with a closure cap 26 provided with a threaded central aperture through which is threaded a compression spring adjustment screw 27 which engages a spring contacting element 28 on the inside of tube 24. The compression to which spring 22 is subjected may be regulated as desired by the adjustment screw 27 and, upon securing the desired compression, it will maintain the clutch engaged for the desired load. The adjustment screw 27 is locked in place by lock nut 29 carried on screw 27.

In the event of an overload the semi-circular faces of the recesses 19 in which the semi-circular cam face is seated will have a camming action upon the face 18 which overcomes the compression of spring 22, thereby permitting the latch cam to disengage itself from the semi-circular grooves 19 on the driving hub 7 which will then permit the sprocket 6 to rotate freely upon the shaft or arbor 5.

In many machines in which overload clutches are employed, it is highly desirable to provide means which will maintain the overload clutch in non-driving or disengaged condition after disengagement of the clutch due to overload until the operator of the machine is again ready to set the machine in operation and engage the clutch. To assure the locking of the clutch in a disengaged position, the clutch has been provided with a spring loaded pivot latch 30 pivoted on stud 31 carried by the web element 13 and having a notch 32 in one end thereof overlapping and in contacting engagement with the wedge end 33 of the latch lever 20 to engage and maintain the latch lever in clutch disengaging position after each overload of the clutch. To automatically accomplish the latching operation, the free end of the pivot latch 30 is subjected to pressure from a compression spring 34 seated at one end in a recess 35 on the under side of the free end of the pivot latch 30 and supported at its other end in a recess 36 in an outwardly extending web member 37 formed on the outer periphery of the collar 9.

Many types of overload clutches now available on the market are capable of disengagement only when the driving element rotates in one direction. In the clutch element comprising this invention the direction of rotation of the driving spur or gear is immaterial. The cam faces of the semi-circular grooves 19 are equally effective upon the semi-circular cam faces 18 of the latch cam 16 when rotated in either direction and will, therefore, disengage the clutch upon overload thereof irrespective of the direction of rotation.

If the overload clutch of this invention is disengaged and locked in disengaged position by the pivot latch 30, it may be easily re-engaged by rotating the driving gear 6 until the latch cam 16 and a complementary groove 19 are in position for registry whereupon the notched end 32 of the pivot latch 30 is then disengaged from the wedge or catch end 33 of the latch lever 20 by manually applying an outward pressure to the finger grip 38 provided at the notched end of the latch 30. The compression spring 22 will thereupon cause a partial rotation of the latch cam 16 until the cam faces 18 again register in and engage the sides of the groove 19.

Figure 3:
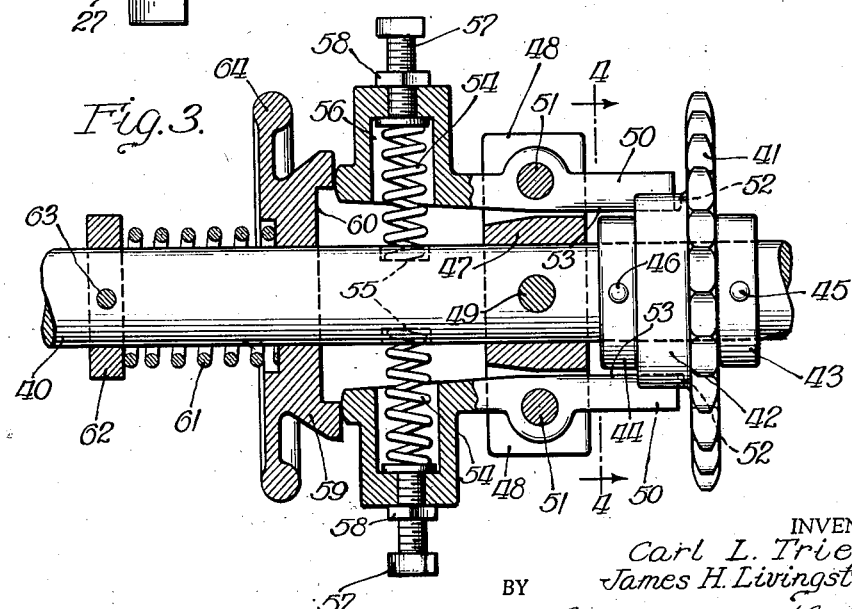
Figure 3 is a vertical longitudinal sectional view taken through the axis of the driving and driven elements of a modified embodiment of this invention in an overload clutch.
Figure 4:
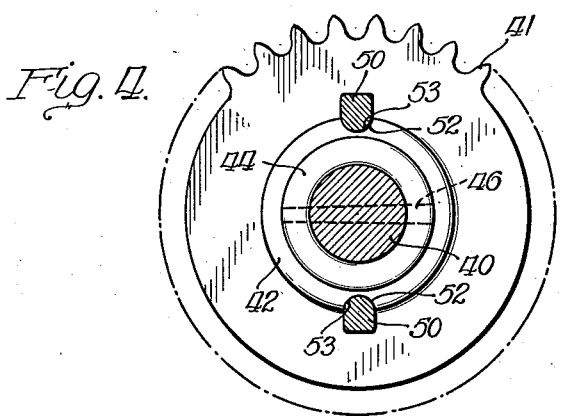
Figure 4 is a vertical transverse sectional view taken along the line 4—4 of Figure 3.

Figures 3 and 4 illustrate a modified embodiment of the invention in which 40 designates a driven shaft or arbor supporting a driving gear or spur 41 journalled thereto in freely rotatable condition by a hub 42 which is maintained in predetermined axial position upon the shaft 40 by collars 43 and 44 keyed to the shaft 40 by pins 45 and 46 and abutting up against the ends of the hub 42. A third collar 47 provided with outwardly extending lugs 48 is keyed to the shaft 40 by a key 49 and is positioned adjacent the collar 44. Clutch or latch elements 50 are pivoted on studs 51 carried by lugs 48. One end of the clutch elements 50 extends over to and overhangs the hub 42 which is provided with a plurality of semi-circular mortice grooves 52 in its outer periphery symmetrically positioned with respect to the clutch elements 50 which are provided with semi-circular cam faces 53 on their ends overhanging the hub 42, which semi-circular cam faces 53 engage and register with the semi-circular grooves 52 to provide a clutch engagement and to impart a driving force from the driving gear 41 to the collar 47 and thence to the driven shaft 40.

The clutch elements 50 are pivoted intermediate their centers of gravity and respective cam means or faces and are normally maintained in engagement with the semi-circular recesses 52 in the hub 42 by the compression of compression springs 54 which apply pressure to the opposite end of the pivoted clutch elements 50, thereby tending to maintain the semi-circular cam faces 53 of the pivoted clutch elements 50 in engagement with the semi-circular recesses 52 in hub 42. The compression springs 54 extend radially from the shaft 40 having one end seated in recesses 55 in shaft 40 and having their opposite ends extending into recesses 56 in the pivoted clutch elements 50, which recesses are intermediate the pivot studs 51 and the end of the pivoted clutch elements 50 opposite the clutch engaging ends 53.

In many machines using overload clutches of the type contemplated by this invention, either in the preferred embodiment as shown in Figures 1 and 2, or in the modified embodiment as shown in Figures 3 and 4, it is desired to regulate or adjust the compression of the springs which maintain the clutch in engagement. To this end spring compression adjustment screws 57 are provided. The adjustment screws 57 are threaded into suitable apertures in the pivoted clutch elements 50 and in line with the spring recesses 56 whereupon the threading of the screws 57 into the recesses 56 will cause the engagement of the spring compression plate 58 with the springs 54 whereby compressive force may be applied to the springs 54 by tightening the screws 57. When a satisfactory compression of springs 54 has been attained, adjustment screws 57 are locked in position by tightening the lock nuts 58.

In the operation of the clutch, the driving force may be applied to either member, i. e., shaft 40 or gear 41, and in the event an overload is applied the semi-circular faces of the recesses 52 in which the semi-circular cam faces 53 are seated will have a camming action upon the faces 53, overcoming the compression of springs 54 and the centrifugal force of the unbalanced weight of the end of the pivoted clutch elements 50, the springs 54 and the elements 57 and 58 to permit the clutch elements 50 to become disengaged from the driving hub 42. When such an occurrence takes place the gear wheel 41 will be free to rotate upon the shaft or arbor 40.

If it is desired to maintain the overload clutch in disengaged condition after each occurrence of an overload, a clutch lever lock is provided. The clutch lever lock comprises a collar 59 suitably journalled upon shaft 40 and abutting up against the free ends of the pivoted clutch elements 50 adjacent the compression springs 54. The collar 59 is provided with an annular recess 60 in its face abutting up against the ends of the clutch members 50 and is maintained in such position by a compression spring 61 telescoped over shaft 40 and compressed intermediate the collar 59 and a collar 62 keyed to shaft 40 by pin 63. During normal clutch engaging position the ends of clutch elements 50 which abut up against the face of the collar 59 contact the face slightly outside the recess 60. Upon disengagement of the clutch by overloading the same, the clutch engaging end of the clutch elements 50 is raised out of the recess 52, thereby tilting the opposite ends of the clutch elements inwardly a sufficient distance to bring them within the outer periphery of the recess 60 whereupon the compression spring 61 urges the collar 59 forwardly to lock the elements 50 in position. When it is desired to re-engage the clutch, it is only necessary to recompress the spring 61 by applying a compressive force to the finger grip 64 carried on the outer periphery of the collar 59.

Overload clutches constructed in accordance with this invention are adapted to maintain a positive, non-resilient drive between the driving and driven members. No relative movement between the various clutch elements occurs until the point of overload is reached for which the particular clutch has been adjusted. Then, as has been clearly established by extensive testing, the clutching elements are quickly forced out of the recesses in the driving hub and the driving gear or sprocket assumes a free-running position.

It should also be pointed out that, in clutches embodying this invention, it is immaterial which element is the driving element and which element is the driven element. For the purpose of the preceding explanations it has been elected to refer to the spur gear as the driving element and the shaft and collar carrying the clutch latches as the driven element. However, the operation would be just as satisfactory if the reverse arrangement were to be used.

This invention, therefore, provides a clutch of simple, compact construction which is positive and quick in operation, economical to fabricate and convenient to use. As pointed out, the unique and simple construction, together with the positive, quick action, make it particularly adaptable for use in machines in which quick stopping at a predetermined overload is desired.

Although the invention has been described in its preferred embodiment, as well as a modified construction thereof, it may be possible of various further modifications. The invention is therefore, not to be restricted except in so far as necessitated by the prior art and the spirit of the applied claims.

The invention is hereby claimed as follows:

1. In a device of the character described, rotatable driving and driven members, a hub on one of said members, a plurality of grooves in the periphery of said hub having laterally extending camming faces, a clutch latch keyed to one end of a pivot pin pivoted to the other of said members, a projection on said clutch latch for engaging a groove in said hub to convey a driving force from one of said members to the other of said members, a latch lever keyed to the free end of said pivot pin and biased for movement to maintain said clutch latch engaged in said groove, a compression spring for biasing said latch lever, and a latch catch adapted to releasably engage said latch lever when thrown into clutch disengagement position and biased to maintain said lever in disengaged position.

2. A clutch comprising the combination with driving and driven members mounted for rotation upon a shaft, of a coupling element movably pivoted on one of said members, of coupling engagements provided on the other of said members, of a biased lever fixed to said coupling pivot and adapted to maintain said coupling element in contact with said coupling engagements, of spring means biasing said lever to maintain said coupling element normally in clutch engaged position, of detent means pivoted to the one of said members carrying said coupling element engageable with said lever when in clutch disengaged position and biased against release from such engagement, and gripping means carried by said detent means adaptable for gripping the same to manually release said detent means from said lever for re-establishing a driving connection between the driving and driven members.

3. In an overload clutch, a shaft, a driving gear rotatable upon said shaft and having a peripherally grooved hub, a collar fixed to said shaft and having a ported flange extending outwardly from said collar, a clutch lever extending through said port and pivoted therein, means fixed to one end of said lever and having a cam element to engage said groove, a boss on the other end of said lever biased by a spring to maintain said cam element in engagement with said groove to impart a driving motion to said collar, and a latch lock for engaging said clutch lever and biased to maintain said lever in disengaged position.

4. An overload clutch comprising in combination, a shaft upon which driving and driven members are mounted in axial alinement and spaced one from another, a hub on said driving member having a peripheral notch with laterally disposed camming faces, said hub journalling said driving member upon said shaft free to rotate thereon, a pivot shaft pivoted to said driven member, a latch cam keyed to one end of said pivot shaft and overhanging said notched hub and adapted to engage said notch, a latch lever keyed to the opposite end of said pivot shaft and biased for movement to maintain said latch cam in engagement with said notch, a latch lock pivoted on said driven element adapted to engage said latch lever when in clutch disengaged position, and means biasing said latch lock toward said latch lever.

5. The combination with driving and driven members rotatable about the same axis, of a hub projecting axially from one of said members and having peripherally disposed grooves of semi-circular cross section, of a coupling lever pivoted intermediate its ends to the other of said rotatable members and having at one end thereof a semi-circular cam means engageable with one of said grooves for the operative transmission of motion between said members in either direction of rotation, said coupling lever being pivoted intermediate said cam means and the center of gravity of said lever and being pivotally movable to an uncoupled position upon the occurrence of overload in either direction of rotation, and of means biasing said coupling lever to maintain it in coupled position, whereby upon the rotation of the driving and driven members the unbalanced centrifugal force of said coupling lever will tend to aid the biasing means in maintaining the cam means engaged with a groove.

6. The combination with driving and driven members rotatable about the same axis, of a hub projecting axially from one of said members and having peripherally disposed grooves of semi-circular cross section, of a coupling lever pivoted intermediate its ends to the other of said rotatable members and having at one end thereof a semi-circular cam means engageable with one of said grooves for the operative transmission of motion between said members in either direction of rotation, said coupling lever being pivoted intermediate said cam means and the center of gravity of said lever and being pivotally movable to an uncoupled position upon the occurrence of overload in either direction of rotation, of means biasing said coupling lever to maintain it in coupled position, whereby upon the rotation of the driving and driven members the unbalanced centrifugal force of said coupling lever will tend to aid the biasing means in maintaining the cam means engaged with a groove, and of a locking means adjacent the one end of said coupling lever and engageable with said coupling lever in clutch disengaged position and biased against release of such engagement.

7. In an automatically releasable overload clutch, the combination of a rotatable shaft carrying driving and driven clutch elements, a hub on one of said elements formed with a plurality of peripheral mortice grooves, a latch cam pivoted on said other element and having a cam face positioned at one end thereof engageable with one of said grooves for transmission of torque from said driving to said driven element, a catch element on said latch cam on the opposite end thereof from said cam face for engagement with a lock element, and a lock element journaled on said other element and engageable with said catch element in clutch disengaged position and biased against release of said engagement.

8. In an automatic overload release clutch of the type described, the combination of a rotatable shaft, a support fixed to said shaft, a device having a hub with peripheral mortice grooves rotatably mounted on said shaft, a clutch lever supported intermediate its ends on said support and having a projection to engage one of said grooves in said hub for drivingly connecting said support with said device, a catch at the opposite end of said clutch lever for engaging a locking means, a locking means supported adjacent the end of said clutch lever which is provided with a catch, said locking means having a socket and being adapted to engage said catch in any of its possible rotative positions, and spring means for biasing said clutch lever toward clutch engaging position.

9. In a device of the character described, the combination with a driving member having a hub provided with peripheral grooves and rotatably journalled upon a shaft, of a driven member fixedly mounted upon said shaft in close proximity to said driving member, of a clutch cam face on one end of a clutch lever extending through said driven member and supported intermediate its ends, of means biasing said clutch lever to move said cam face toward groove engaging position, said biasing means being positioned on said driven member to which said clutch lever is pivoted and on the opposite side thereof from said cam face, said biasing means being capable of yielding to allow the cam face to be forced out of engagement when undue resistance is encountered, and means for holding the pivot pin in inoperative position until reset.

10. In a device of the class described having driving and driven members, a rotating driving member having a peripheral notch, an arm pivoted intermediate its ends to said driven member and having at one end a notch engaging element adapted to enter said peripheral notch of said driving member to receive driving force from said driving member, spring means engaging the opposite end of said pivoted arm biasing said arm to maintain the notch engaging element in engagement with said notch, and a spring biased locking means adapted to engage the spring biased end of said arm when thrown into position in which the notch engaging element thereof is disengaged from said notch and so hold the arm in inoperative position until reset.

CARL L. TRIER.
JAMES H. LIVINGSTON, 3RD.